(12) United States Patent
Shiraishi et al.

(10) Patent No.: US 7,398,599 B2
(45) Date of Patent: *Jul. 15, 2008

(54) DEVICE FOR REMOVING COATING ON OPTICAL FIBER

(75) Inventors: Keiko Shiraishi, Kanagawa (JP); Mituo Itoh, Kanagawa (JP); Tomotaka Murase, Kanagawa (JP); Kenichi Muta, Kanagawa (JP); Masaru Kobayashi, Tokyo (JP); Takashi Yoshida, Tokyo (JP); Koichi Arishima, Tokyo (JP); Shin Sumida, Tokyo (JP)

(73) Assignee: SWCC Showa Cable Systems Co., Ltd, Tokyo (JP)

( * ) Notice: Subject to any disclaimer, the term of this patent is extended or adjusted under 35 U.S.C. 154(b) by 830 days.

This patent is subject to a terminal disclaimer.

(21) Appl. No.: 10/783,022

(22) Filed: Feb. 23, 2004

(65) Prior Publication Data
US 2004/0181945 A1  Sep. 23, 2004

Related U.S. Application Data

(63) Continuation-in-part of application No. 10/110,713, filed on Apr. 15, 2002, now Pat. No. 6,754,960.

(30) Foreign Application Priority Data
Oct. 20, 1999 (JP) .............................. 1999-298155
Oct. 20, 2000 (WO) ........................ PCT/JP00/07246

(51) Int. Cl.
*H02G 1/12* (2006.01)
(52) U.S. Cl. ................... 30/90.1; 30/90.6; 81/9.44; 83/13
(58) Field of Classification Search ............... 30/90.1, 30/91.2, 94, 123, 253, 234, 345, 90.4, 90.6, 30/279.2, 278; 81/9.4, 9.44
See application file for complete search history.

(56) References Cited

U.S. PATENT DOCUMENTS

| 1,490,459 | A |  | 4/1924 | Fergussen |
| 2,503,517 | A |  | 4/1950 | Sirica |
| 2,681,504 | A |  | 6/1954 | Fox |
| 4,059,892 | A |  | 11/1977 | Siden |
| 4,748,871 | A | * | 6/1988 | Zdzislaw ..................... 81/9.4 |
| 5,046,252 | A | * | 9/1991 | Ayuta et al. ................. 30/258 |
| 6,273,990 | B1 | * | 8/2001 | Bookbinder et al. ........ 156/344 |
| 6,708,749 | B2 | * | 3/2004 | McLeod ..................... 156/584 |

(Continued)

FOREIGN PATENT DOCUMENTS

JP  57-76503  5/1982

(Continued)

*Primary Examiner*—Hwei-Siu C. Payer
(74) *Attorney, Agent, or Firm*—Jeffrey S. Melcher; Manelli Denison & Selter, PLLC

(57) ABSTRACT

Provided is a device for removing coating on an optical fiber. The device has a cutting depth limiting surface disposed on a receiver body and a cutting blade attached between a pusher body and a fixing block. The cutting blade is made from plastics and has a specified bending elasticity. An optical fiber is inserted between the cutting blade and the limiting surface. During operation, the cutting blade cuts into a covering on the optical fiber. A high precision in arranging the cutting blade is not required.

15 Claims, 13 Drawing Sheets

U.S. PATENT DOCUMENTS 6,754,960 B1 * 6/2004 Shiraishi et al. .............. 30/90.6

FOREIGN PATENT DOCUMENTS

| | | |
|---|---|---|
| JP | 142803/1990 | 4/1990 |
| JP | 119605/1990 | 9/1990 |
| JP | 6608/1991 | 1/1991 |
| JP | 10-307213 | 11/1998 |

* cited by examiner

FIG. 9
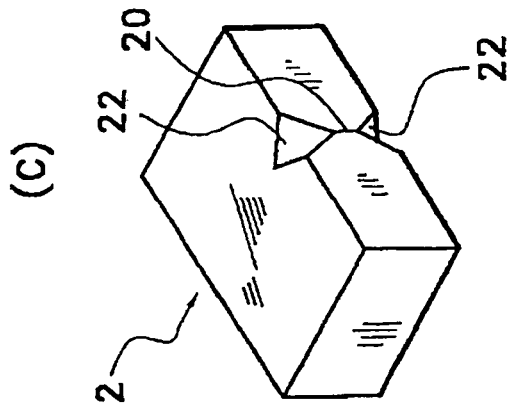
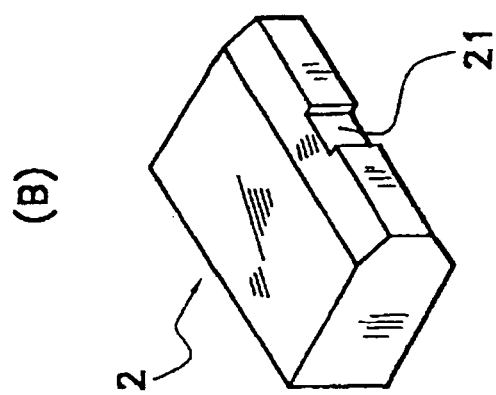
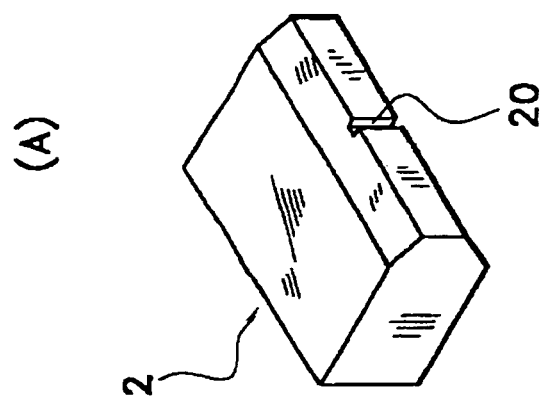

_US 7,398,599 B2_

DEVICE FOR REMOVING COATING ON OPTICAL FIBER

This application is a Continuation-in-Part of U.S. Ser. No. 10/110,713, filed on Apr. 15, 2002, now U.S. Pat. No. 6,754,960, issued Jun. 29, 2004, the complete disclosure of which is incorporated herein by reference.

FIELD OF THE INVENTION

The present invention relates to a device for removing covering of an optical fiber, more particularly, it relates to a device for removing covering of an optical fiber without damaging the optical fiber main body or the non-peeled-off layer (or the primary coating), eliminating needs for high precision in cutting blade arrangement.

BACKGROUND OF THE INVENTION

In the prior art, an optical fiber is known which has an optical fiber main body including a core of crystal and a clad, the optical fiber main body is covered with a non-peeled-off layer (or primary coating) of ultra-violet ray-setting resin (UV resin), thermo-bridged resin or the like, which is further covered with a primary and a secondary covering layers.

When such an optical fiber is connected to a connector or the like, the primary and the secondary covering layers are removed but the non-peeled-off layer is left not removed to prevent the optical fiber main body.

By the way, in the device for removing the covering of an optical fiber of the prior art, a metal cutting blade is fixed to an attachment plate and the like. The cutting blade is set beside an optical fiber, and then the cutting blade is cut into the covering layers. Then, the optical fiber is pulled along the elongate direction of the optical fiber with the cutting blade being cut into the covering layers, thus, the covering layers are removed.

However, the device of the prior art has following problems to be solved:

Since the device for removing the covering of an optical fiber of the prior art has a rigid cutting blade made from metal, the cutting depth in the covering layers must be precisely selected. If the cutting depth is too large the cutting blade may contact with the optical fiber main body and may damage the non-peeled-off layer. On the other hand, if the cutting depth is too small, the covering layers may not be cut apart, and part of the layers may remain on the periphery of the optical fiber main body, which may result in non-uniform outer diameter, and which may spoil efficiency in connecting work using V-grooves, ferules and the like.

Therefore, precise positioning and fixing of the cutting blade on the attachment plate and the like for fixing the cutting blade is required. However, it may be difficult to assure sufficient preciseness especially in a case where the cutting blade is replaced on the construction site. If the cutting blade were ground to maintain the high precision, the manufacturing cost would become very high. In addition, the blade edge would become opt to stain, which might result in defective cutting.

The present invention has been made to solve the problems described above, and an object of this invention is to provide a device for removing covering of an optical fiber without damaging the optical fiber main body or the non-peeled-off layer, eliminating needs for high precision in cutting blade arrangement.

SUMMARY OF THE INVENTION

A device for removing covering of an optical fiber according to this invention comprises limiting means for limiting cutting depth in the optical fiber, and a cutting blade of elastic plastics. Thus, the covering can be removed without damaging the optical fiber main body or the non-peeled-off layer, eliminating needs for high precision in cutting blade arrangement.

The inventions related to this device comprise the following means to achieve the objects of the inventions:

(1) A device for removing a covering of an optical fiber, the device comprising: a receiver body for receiving an optical fiber with a covering to be removed; a cutting blade adaptive to be relatively moved toward the receiver body for cutting the covering layer of the optical fiber; and a limiting means for limiting cutting depth of the cutting blade in the optical fiber, the limiting means being disposed on a surface of the receiver body facing the cutting blade; wherein the cutting blade is formed of elastic plastics.

(2) A device for removing a covering of an optical fiber according to (1) described above, wherein the cutting blade has a bending elasticity in a range of 900-20,000 MPa.

(3) A device for removing a covering of an optical fiber according to (1) described above, further comprising a guide means having a groove for guiding the optical fiber to a removing position between the receiver and the cutting blade.

(4) A device for removing a covering of an optical fiber, the device comprising: a pair of cutting blades for cutting the covering layer of the optical fiber by moving toward each other; and a limiting means for limiting cutting depth of the cutting blade in the optical fiber; wherein the cutting blade is formed of elastic plastics.

(5) A device for removing a covering of an optical fiber according to (4) described above, wherein the cutting blade has a bending elasticity in a range of 900-20,000 MPa.

(6) A device for removing a covering of an optical fiber according to (4) described above, further comprising a guide means having a groove for guiding the optical fiber to a removing position between the pair of cutting blades.

BRIEF DESCRIPTION OF DRAWINGS

FIGS. 9(A), (B) and (C) are perspective views of different modified embodiments of receiver bodies according to the present invention.

DETAILED DESCRIPTION OF THE INVENTION

Figure 1:
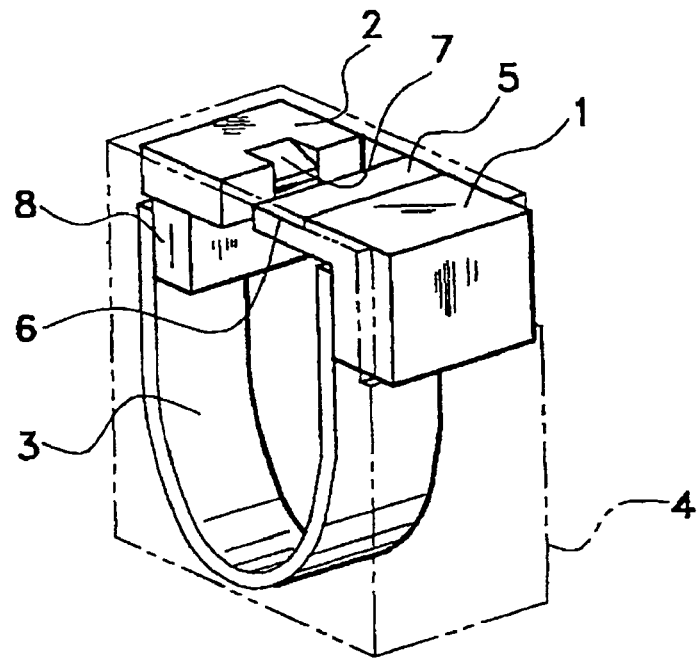
FIG. 1 is a perspective view showing internal structure of a cover removing device according to the present invention.

Now, the present invention is described referring to the drawings showing embodiments of the invention.

Figure 2:
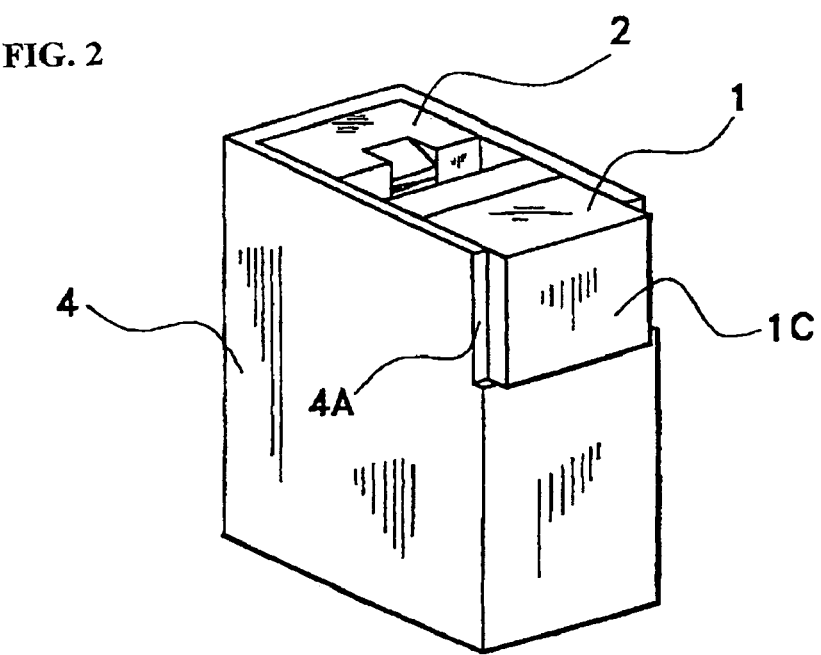
FIG. 2 is a perspective view of a cover removing device according to the present invention.
Figure 3:
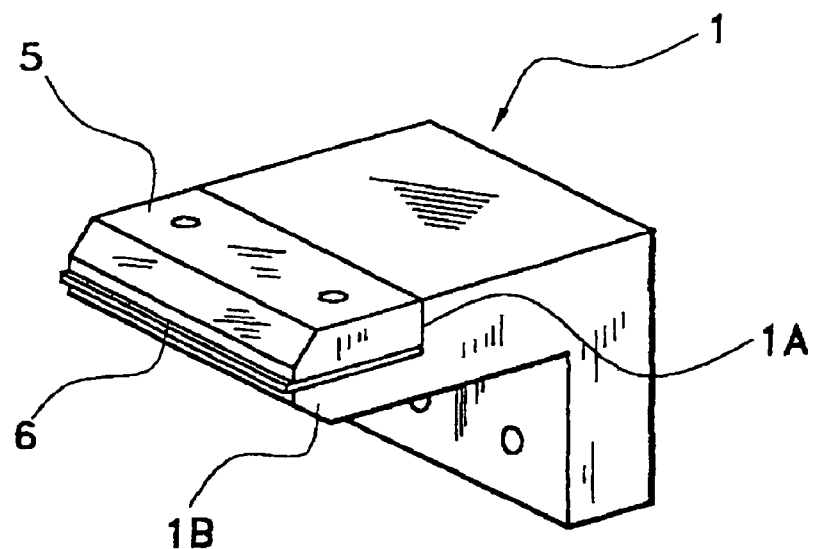
FIG. 3 is a perspective view of a pusher body according to the present invention.
Figure 4:
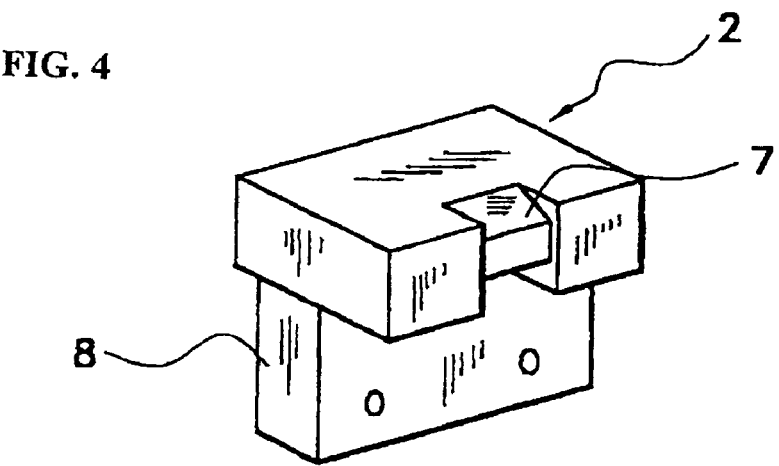
FIG. 4 is a perspective view of a receiver body according to the present invention.

FIGS. 1 and 2 are perspective views of a cover removing device according to the present invention. FIG. 3 is a perspective view of a pusher body 1, and FIG. 4 is a perspective view of a receiver body 2.

This cover removing device has an L-shaped pusher body 1, a receiver body 2 facing the pusher body 1, a U-shaped leaf spring 3 for connecting the pusher body 1 and the receiver body 2, and a casing 4 for containing them. There is a step portion 1A at a leading edge 1B of the pusher body 1 facing the receiver body 2, as shown in FIG. 3. A fixing block 5 is attached to the step portion 1A with bolts. A cutting blade 6 is held between the fixing block 5 and the leading edge 1B of the pusher body 1.

The cutting edge 6 is made of a rectangular plastic plate, which is held so as to have a protrusion of 1 mm or less from the fixing block 5 (leading edge 1B). The cutting blade has a bending elasticity in the range of 900-20,000 MPa. That is because, if the bending elasticity is equal to or less than 900 MPa, cutting into the covering layers might be difficult, and if the bending elasticity is equal to or larger than 20,000 MPa, the non-peeled-off layer or the optical fiber main body may be scratched. Measurement of the bending elasticity has been performed in accordance with "ASTM D 790". The bending elasticity is specified in order to specify a plastic plate which would not damage the optical fiber main body or the non-peeled-off layer. That is, a plastic plate is used for a cutting blade 6, because optimal hardness can be adjusted so that the primary and the secondary covering layers can be cut out without damaging the primary coating on the surface of the optical fiber.

The cutting blade 6 may be made of, for example, PET (poly-ethylene-terephthalate), PP (polypropylene), acrylic, ABS resin (acrylonitrile-butadiene-styrene copolymer), PC (polycarbonate), PBT (polybutylene-terephthalate), PS (polystyrene), AB resin (acrylonitrile-styrene copolymer).

The thickness of the cutting blade 6 is specified in a range of 0.06-1 mm. If the thickness is 0.06 mm or less, the strength may be too small. In addition, the blade may be too sharp and may damage the primary coating on the optical fiber. On the other hand, if the thickness is 1 mm or more, large force may be required to cut into the covering layers on the optical fiber, which may result in a breakage of the optical fiber main body due to large pressing force. Thus, appropriate thickness of the cutting blade 6 can enhance functions of cutting and peeling off the primary and the secondary covering layers without damaging the primary coating on the optical fiber surface. Thus, the cutting blade does not have a sharp edge as a sharp cutting edge but it has an edge surface of a certain width perpendicular to the both sides of the blade. Therefore, the optical fiber main body is not pushed with a sharp edge. Further effects of this configuration will be explained later with reference to FIG. 13 etc.

The receiver body 2 is made of hard material such as metal including stainless steel, glass or carbon FRP. The receiver body 2 is formed in a block as shown in FIG. 4. A limiting body 7 is formed in the center of the side facing the cutting blade 6. The leading edge of the cutting blade 6 is slightly protruding from the leading edge 1B of the pusher body. The protruding portion is pushed to the covering of the optical fiber 9 and cuts the covering. At that time the optical fiber is pushed to the limiting body 7 of the receiver body 2. The limiting body 7 has a limiting surface 7A which is depressed by "t" from a facing surface (a surface nearest to the optical fiber) of the receiver body 2. The depression "t" may be specified, for example, as a diameter of the optical fiber added with 10-40 micrometers.

The limiting body 7 is disposed in order to fix the optical fiber 9, preventing the fiber 9 from moving from the center of the receiver body 2. The depression "t" is specified as a diameter of the optical fiber added with 10-40 micrometers in order to prevent the optical fiber main body from getting damage by clamping with excessive strength between the limiting surface 7A and the cutting blade 6 after the cutting blade 6 has cut the covering layers of the optical fiber. Thus, the gap between the limiting surface 7A and the cutting blade 6 would not become smaller than the dimension of the diameter of the optical fiber added with 10-40 micrometers, and the optical fiber is protected.

Upper and lower portions of the limiting surface 7A have chamfers 7B to protect the optical fiber main body (non-peeled-off layer) from getting damage when the optical fiber is pulled out. The covering layers are removed from the end of the optical fiber for a certain length when the optical fiber 9 is pulled out with the limiting surface 7A and the cutting blade 6 pinching the optical fiber between them after the coverings of the optical fiber 9 are cut near an end by the cutting blade 6. At that time, if the optical fiber main body is pushed hard against the edge of the limiting surface 7A, the optical fiber main body gets scratches. Therefore, the width of the limiting surface 7A in the longitudinal direction of the optical fiber is preferably small. However, if the width is too small, it would become difficult to hold the optical fiber with its axis perpendicular to the edge of the cutting blade 6 when cutting the coverings with the cutting blade 6 pushed against the coverings of the optical fiber 9 at perpendicular arrangement. Thus, the limiting surface 7A has the chamfers 7B.

The receiver body 2 is fixed on top surface of an attachment block 8 as shown in FIG. 1. The attachment block 8 and the pusher body 1 are combined to each one of the ends of the U-shaped leaf spring 3.

Now, the operation of the cover removing device according to the embodiment described above will be explained.

Figure 5:
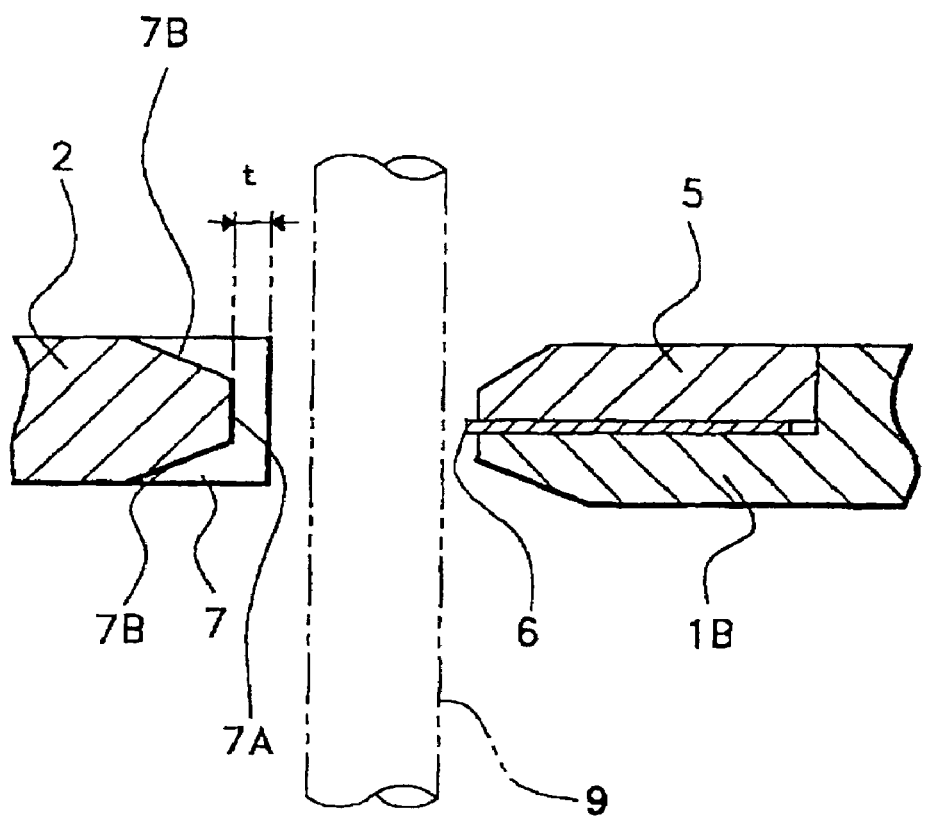
FIG. 5 is a partial cross-sectional view of a cover removing device according to the present invention, showing a state in use.

The optical fiber 9 shown in FIG. 5 has an outer diameter of 0.25 mm, and comprises an optical fiber main body with an outer diameter of 125 micrometers including a core and a clad made of crystal. The optical fiber 9 also has a non-peeled layer of UV resin of a thickness of 2-15 micrometers surrounding the optical fiber main body. The optical fiber 9 further has primary and secondary covering layers of UV resin surrounding the non-peeled layer.

First, the pusher body 1 with the cutting blade 6 attached thereto, the receiver body 2, the leaf spring 3 etc. are displaced in the casing 4. At this time, the pushing surface 1C of the pusher body 1 protrudes from the open side portion 4A in the casing 4.

Then, an optical fiber 9 is inserted between the cutting blade 6 (the leading edge 1B of the pusher body 1) and the receiver body 2 so that the optical fiber 9 is arranged between the cutting blade and the receiver body2. The arranged length is about 40 mm.

Then, the pushing surface 1C of the pusher body 1 is pushed with an operator's finger against elastic force of the leaf spring so that the leading edge 1B of the pusher body 1 moves toward the receiver body 2.

Thus, the cutting blade 6 is pushed toward the facing surface of the receiver body 2 by the pushing operation. When the cutting blade 6 touches the optical fiber, the optical fiber 9 is pushed against the limiting surface 7A. Then, the cutting blade 6 cuts into the primary and secondary covering layers. Then, the optical fiber 9 is pulled upward in its longitudinal direction with the cutting blade 6 sustained. Thus, the covering layers are peeled off from the optical fiber main body (non-peeled layer), and left in the casing 4 as waste.

When the cutting blade 6 made of plastics of the shape described above is used, the cutting blade 6 would not damage the optical fiber main body or the non-peeled layer even if the cutting blade 6 touches them because the edge of the cutting blade 6 is softer than the optical fiber main body and the non-peeled layer. Therefore, high precision of the protruding height of the cutting edge is not required even when the cutting blade 6 is held using the fixing block 5, and high precision of the depression "t" which decides the limiting surface 7A is not required either. Therefore, attaching, adjusting and handling of the cutting blade 6 is easy, and the cutting blade 6 etc. can be easily replaced at the installation site depending on the types of the optical fibers.

In addition, the cutting blade 6 can be formed only by cutting a plastic plate without sharpening an edge by grinding, which results in low manufacturing cost. The material cost would be also low because the specification for the plastic plate may not be special. Furthermore, the receiver body 2 etc. do not require precise dimensions. Thus, the apparatus can be provided at low cost.

For verification tests, a PET film (or plate) with a thickness of 0.5 mm was used as a cutting blade 6, which was arranged to protrude 1 mm at its edge in the cover removing device shown in FIG. 1. The used sample optical fibers had outer diameters of 0.25 mm had non-peeled layers of UV resin.

Fifty samples of optical fiber are prepared. The part of covering layer of the each sample was peeled off along the longitudinal direction. The length of the part is 40 mm. It was found that the cutting blade 6 damaged none of the optical fibers. In addition, tensile strength of the optical fibers measured after the covering layers were peeled off were in a range of 4.4 to 4.6 GPa which were at almost the same level as the strength of the optical fibers before the covering layers were peeled off, which demonstrated that the optical fiber main bodies were not damaged.

Figure 6:
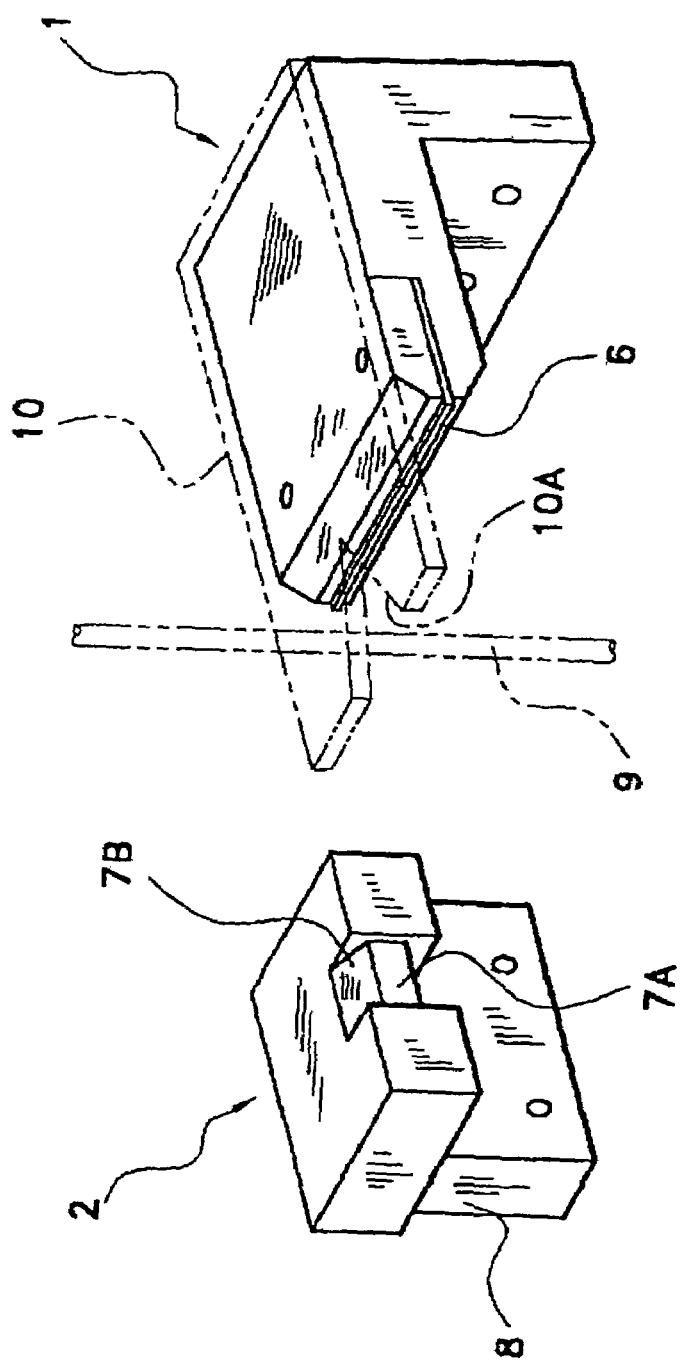
FIG. 6 is a perspective view of main portions of a modified embodiment of the present invention.

FIG. 6 is a perspective view of a modified embodiment of the present invention. In this modification, a guide plate 10 is attached on top surface of the pusher body 1. The guide plate 10 has a guide notch 10A formed at the center of the leading edge facing the receiver body 2. By disposing the optical fiber in the notch 10A, the optical fiber 9 can be automatically positioned on the limiting surface 7A of the limiting body 7 when the pusher body 1 is moved toward the receiver body 2.

Figure 7:
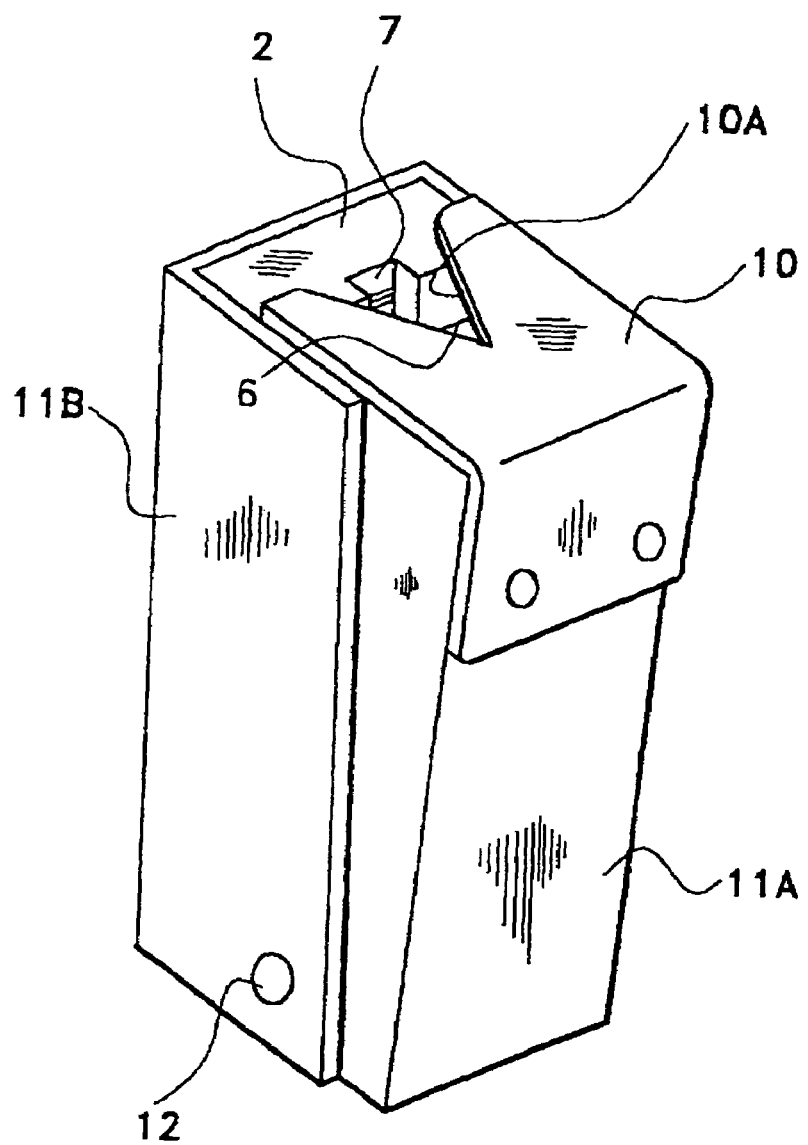
FIG. 7 is a perspective view of another embodiment of a cover removing device according to the present invention.

FIG. 7 is a perspective view of another embodiment of a cover removing device according to the present invention.

In this embodiment, a casing 11 has two half casing parts 11A and 11B, lower portions of which are pivotally connected to each other with a pin 12. The half casing parts 11A and 11B are biased at their upper portions away from each other by spring means (not shown). The guide plate 10 with the guide notch 10A is fixed on the half casing part 11A.

The casing 11 has the pusher body, the receiver body 2 and the cutting blade 6 therein, and this embodiment is operated in the same manner as the embodiment shown in FIG. 1.

Figure 8:
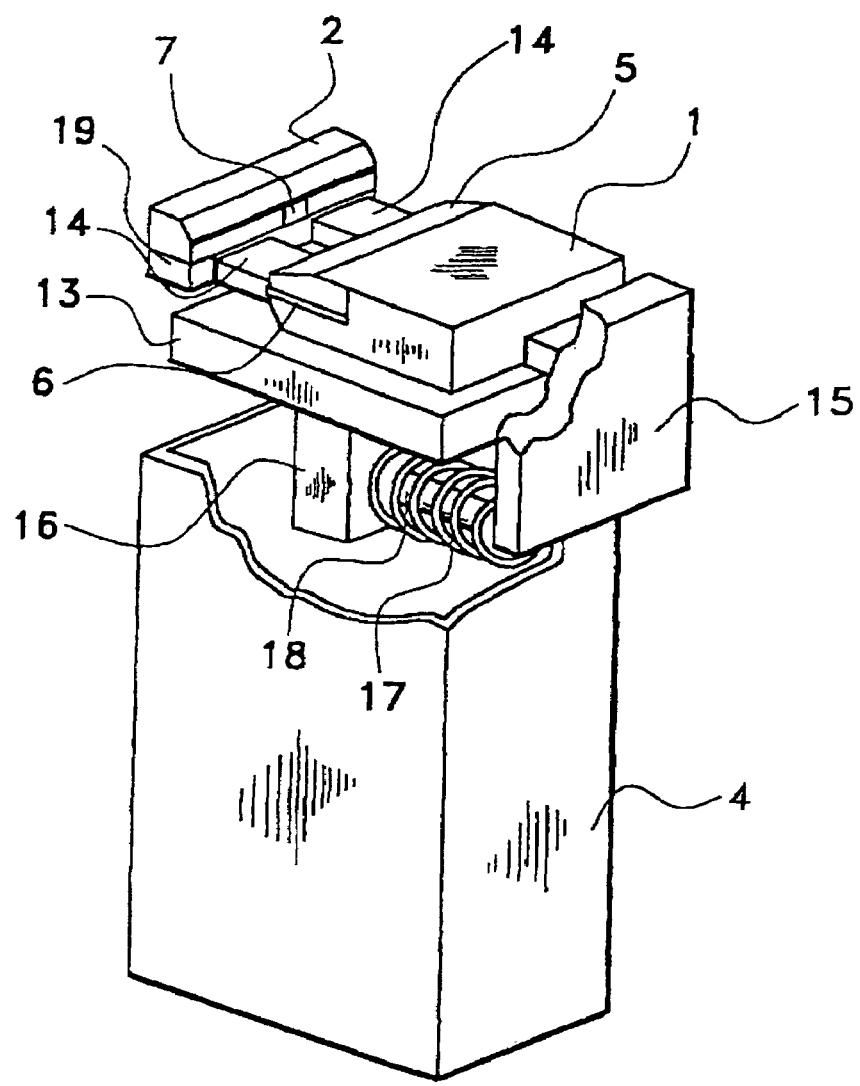
FIG. 8 is a perspective view of yet another embodiment of a cover removing device according to the present invention.

FIG. 8 is a perspective view of another embodiment of a cover removing device according to the present invention.

In this embodiment, the numeral "13" denotes a base positioned and fixed on the casing 4.

A pair of parallel guide rails 14, 14 are fixed on the base 13. The pusher body 1 is movably attached to the guide rails 14, 14. The cutting blade 6 is attached on the leading edge of the pusher body 1 with the fixing block 5 in a similar way as described above. A pusher plate 15 is fixed on a back side of the pusher body 1. A coil spring 17 is disposed between the lower part of the pusher plate 15 and an extending plate 16 which extends from the lower surface of the base 13. The coil spring 17 is attached to a short supporting rod 18 protruding from the extending plate 16, and the coil spring 17 biases the pusher plate 15 away from the extending plate 16.

A supporting plate 19 is fixed on the leading edge of the guide rails 14, 14, and the receiver body 2 is fixed on the supporting plate 19. The limiting body 7 is formed in the receiver body 2 as described above.

In this embodiment, when the pusher plate 15 is pushed against elastic force of the coil spring 17, the pusher body 1 moves along the guide rails 14, 14 toward the receiver body 2. Thus, when the cutting blade 6 contacts the facing surface of the receiver body 2, the cutting blade 6 cuts into the covering layers of the optical fiber which has been positioned at the limiting body 7. Then, the covering layers can be peeled off by pulling the optical fiber.

FIGS. 9 are perspective views of modified embodiments of receiver bodies according to the present invention.

The receiver body 2 of FIG. 9(A) has a V-shaped notch 20 as a limiting body at the surface facing the cutting blade. When this V-shaped notch 20 is formed, the guide plate 10 is effective and the optical fiber can be guided to the V-shaped notch 20 without fail. The receiver body 2 of FIG. 9(B) has a wide groove 21 as a limiting body. This groove 21 has two sides ground in round shapes to prevent the damage on the optical fiber main body during pulling work. The receiver body 2 of FIG. 9(C) has two openings 22, 22 at both ends of the V-shaped notch 20, resulting in a cross-sectional shape shown in FIG. 5. By this shape, damage on the optical fiber main body etc. during pulling is prevented.

Figure 10:
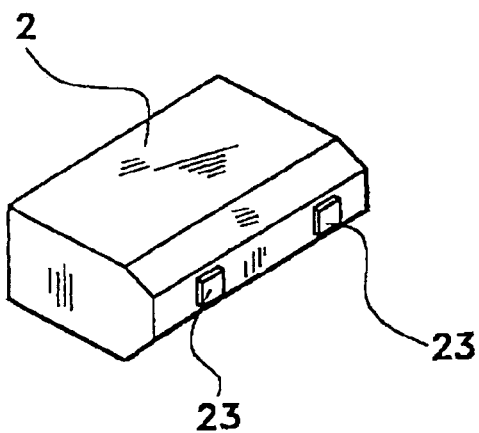
FIG. 10 is a perspective view of yet another modified embodiment of a receiver body according to the present invention.

FIG. 10 is a perspective view of yet another modified embodiment of a receiver body according to the present invention.

The receiver body 2 has spacers 23, 23 on the surface facing the cutting blade. The spacers 23, 23 have protruding dimension corresponding to the diameter of the optical fiber main body added with 10-40 micrometers.

Figure 11:
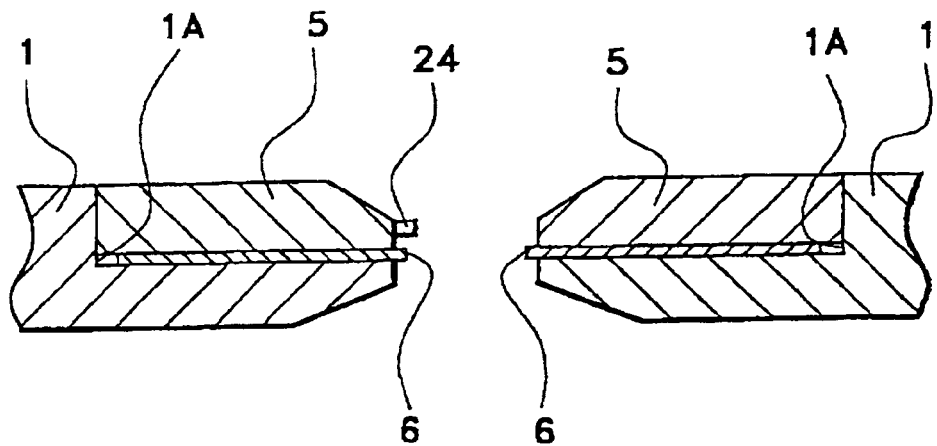
FIG. 11 is a cross-sectional view of a main part of a cover removing device according to another invention.

FIG. 11 is a cross-sectional view of a main part of a cover removing device according to another invention.

This cover removing device has a pair of pusher bodies 1, 1 disposed facing each other, and a pair of cutting blades 6, 6. Each one of the pusher bodies 1, 1 has a step portion 1A, and each one of the step portions has a cutting blade 6. A fixing block 5 is fastened to each one of the steps 1A by bolts. The pair of the cutting blades 6 with their leading edges facing each other are made from plastics as in the embodiment described above, and have bending elasticity within the range specified above. A spacer 24 is attached on one of the leading edges of the fixing blocks 5. The spacer 24 is protruding from the leading edge of the cutting blade 6 disposed below the spacer 24, and the protruding dimension corresponds to the outer diameter of the optical fiber main body added with 10-40 micrometers.

The reason for specifying the spacers 24 is the same as the reason for specifying the dimension of the depression "t" as a diameter of the optical fiber added with 10-40 micrometers in the embodiment shown in FIG. 5. The pusher bodies 1, 1 are connected by the leaf spring 3 shown in FIG. 1 and contained in the casing 4.

When one of the pusher bodies 1 of this cover removing device is pushed and the cutting blade 6 contacts the spacer 24, both of the cutting blades 6, 6 cut into the covering layers of the optical fiber similarly as described above. Then, the covering layers can be peeled off by pulling the optical fiber.

In this embodiment, the guide plate 10 shown in FIG. 1 may be attached to the pusher body 1 in order to guide the optical fiber to the position where the covering layers are removed.

Figure 12:
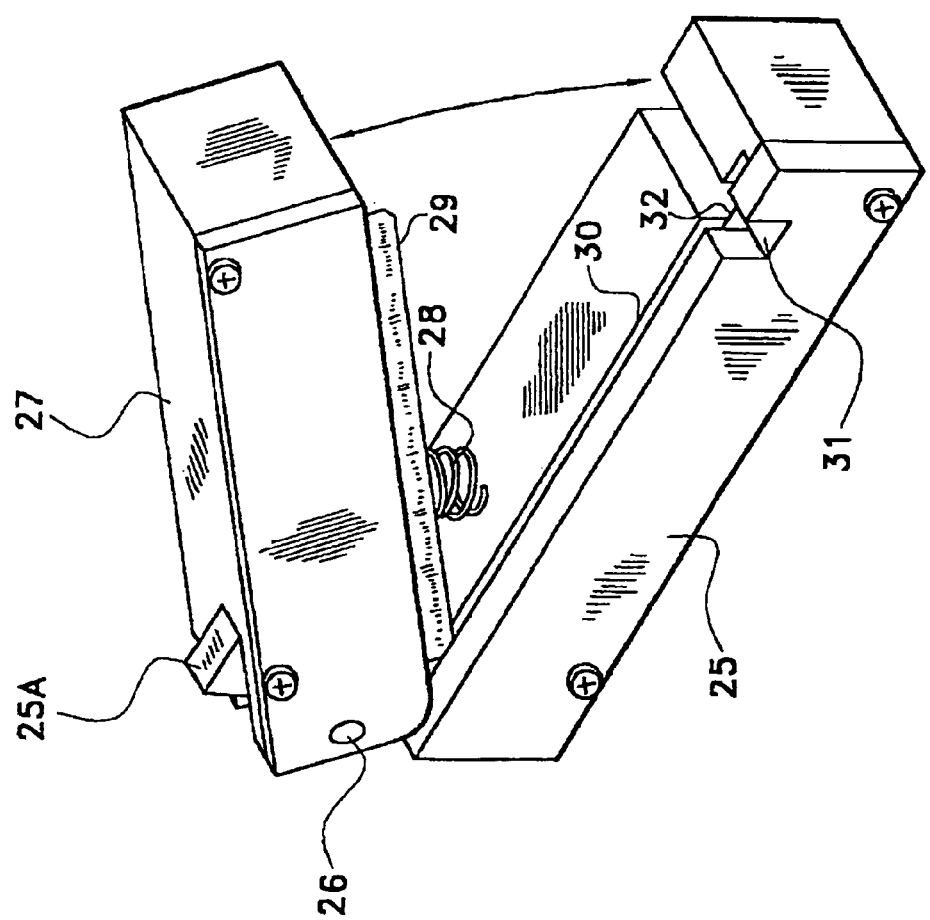
FIG. 12 is a perspective view of another embodiment of a cover removing device according to another invention.

FIG. 12 is a perspective view of another embodiment of a cover removing device according to another invention.

This cover removing device has a receiver body 25 formed of an elongated block of plastics, and a pusher body 27 which is pivotally connected to a protruding portion 25A on an end of the receiver body 25 via a pivot pin 26. The pusher body 27 is made of a block of similar size as the receiver body 25. The pusher body 27 pivots around the pin 26 toward the upper surface of the receiver body 25. A coil spring 28 is disposed between the pusher body 27 and the receiver body 25 for pushing them away from each other.

An elongated cutting blade 29 protrudes from the lower surface of the pusher body 27 along its elongated direction. An elongated guide groove 30 is formed in the upper surface of the receiver body 25 for guiding the cutting blade 29.

A through depression 31 is formed near the further end of the receiver body 25, perpendicular to the guide groove 30. The depression 31 is formed for guiding the optical fiber 9 (See FIG. 5). Another cutting blade 32 is disposed on the guide groove 30 in the depression 31. The cutting blades 29 and 32 are made of plastics described above, and have bending elasticity in the range specified above.

Figure 13:
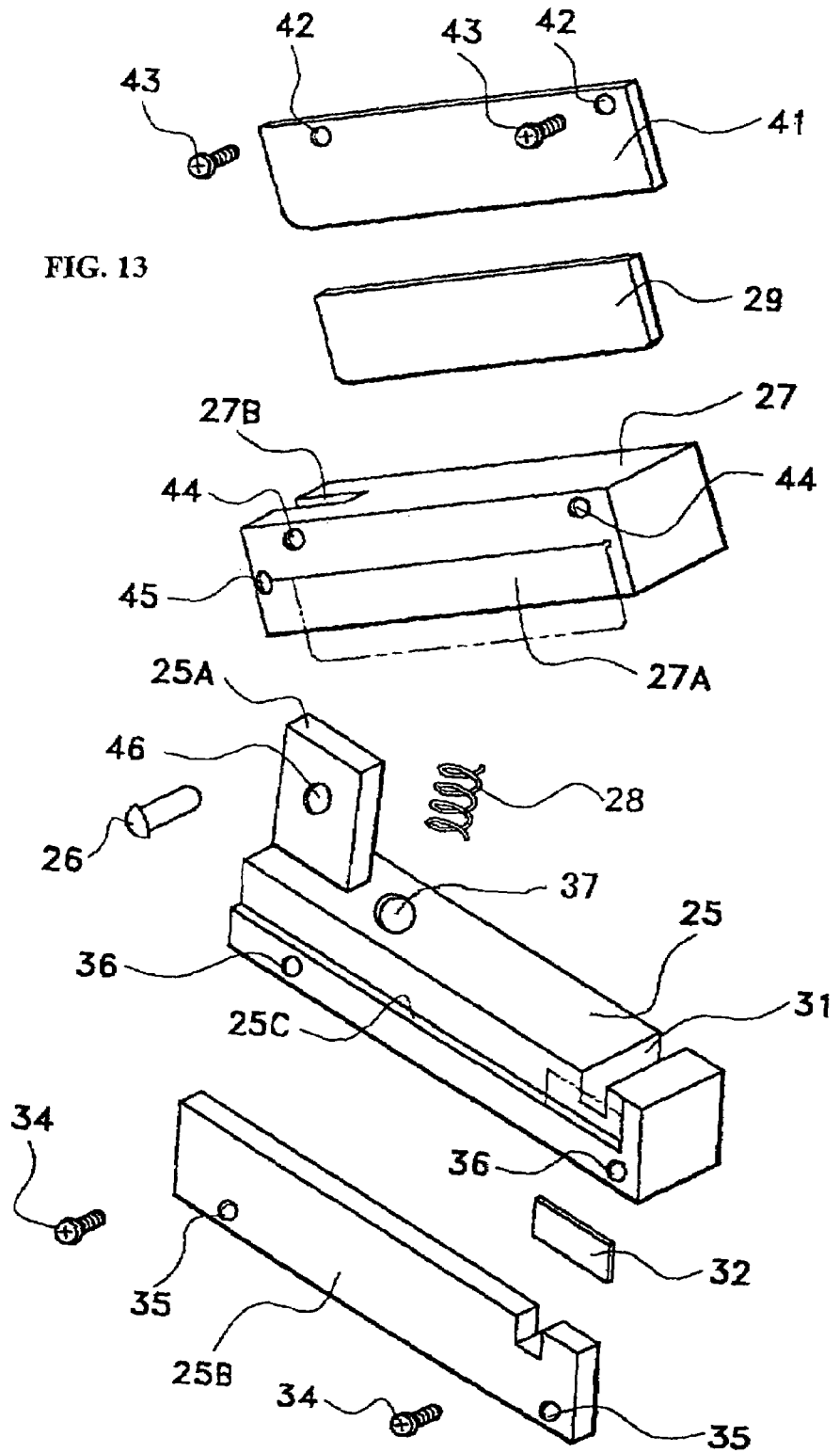
FIG. 13 is an exploded perspective view of the cover removing device shown in FIG. 12.

FIG. 13 is an exploded perspective view of the device described above.

As shown in this figure, the receiver 25 has a step portion 25C on its side. The cutting blade 32 is contained in the step portion 25C near its rightmost end. A cover plate 25B is fastened to the receiver body 25 using screws 34 and threaded holes 35 and 36. Thus, the cutting blade 32 is fixed, and at the same time, the guide groove 30 (See FIG. 12) is formed and a step portion 27A is formed on the side surface of the pusher body 27. The cutting blade 29 is disposed on the step portion 27A. A cover plate 41 is fastened to the pusher body 27 using screws 43 and threaded holes 42 and 44. Thus, the cutting blade 29 is fixed. Then, the protruding portion 25A of the receiver body 25 is inserted into a notch 27B of the pusher body 27, and the pivot pin 26 is inserted into holes 45 and 46. The spring 28 is inserted at its bottom end into a closed hole 37. Then the assembly is finished as shown in FIG. 12.

When the pusher body 27 of the cover removing device described above is moved pivoting against the elastic force of the coil spring 28, the cutting blade 29 is guided into the guide groove 30. When the lower surface of the pusher body 27 moves closer to the upper surface of the receiver body 25, the optical fiber is held between the cutting blades 29 and 32, and the cutting blades 29 and 32 cut into the covering layers of the optical fiber in the depression 31. Then, the covering layers can be removed by pulling the optical fiber.

Figure 14:
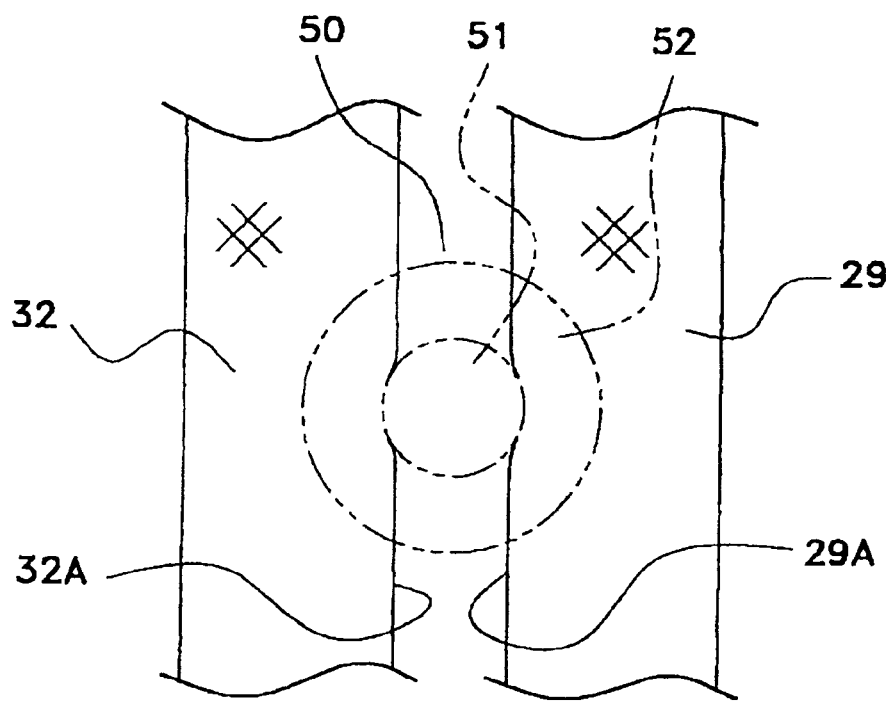
FIG. 14 is an enlarged plan view near the cutting blades, showing operation of the device according to the present invention.
Figure 15:
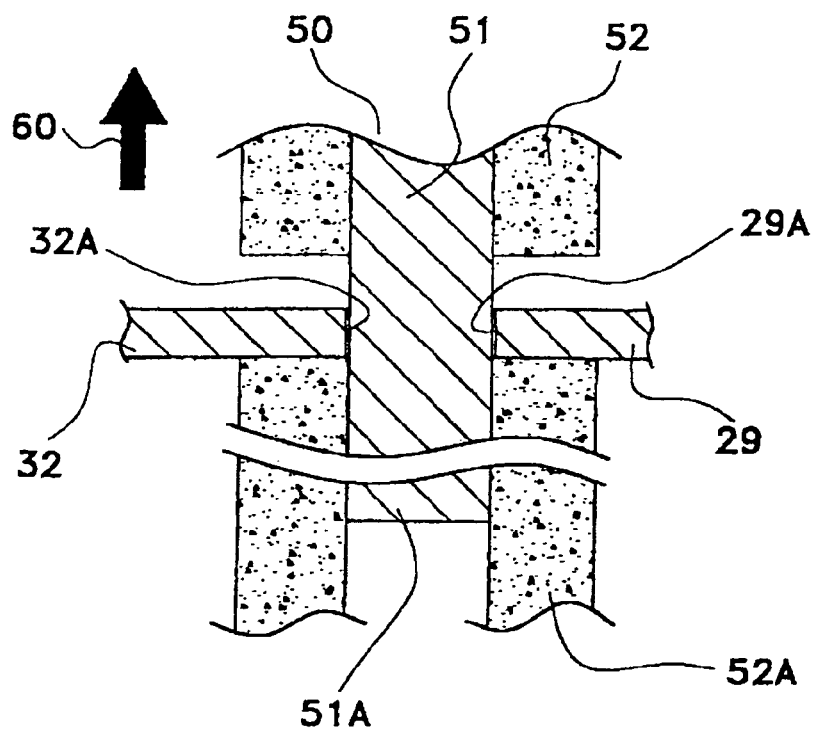
FIG. 15 is an enlarged elevational cross-sectional view near the cutting blades, showing operation of the device according to the present invention.

FIGS. 14 and 15 are enlarged plan views near the cutting blades, showing operation of the device according to the present invention.

As shown in FIG. 14, when the optical fiber 50 is held between the cutting blades 29 and 32, and when their respective edge surfaces 29A and 32A come closer to each other, the edge surfaces 29A and 32A of the cutting blades 29 and 32, respectively, cut into the covering layer 52, and reach the optical fiber main body 51 (including the primary coating).

Collision of the edge of the cutting blade 29 and the optical fiber main body 51 is allowed because the cutting blade 29 is made of plastics and the edge of the cutting blade 29 is soft and elastic. Even in a hard collision, the edge of the cutting blade 29 would slightly bend along the cross-sectional shape of the optical fiber 51, and the optical fiber main body or the primary coating would not be damaged.

When the cutting blades 29 and 32 cut into the covering layer 52, the edge surfaces 29A and 32A of the cutting blades 29 and 32 touch the peripheral surface of the optical fiber main body 51, as shown in FIG. 15. Then, the optical fiber 50 is pulled in the direction shown by an arrow 60 in this figure. The end portion 52A of the covering layer 52 is obstructed to be drawn in the direction of the arrow 60 by the cutting blades 29 and 32 and removed from the end portion 51A of the optical fiber main body 51.

During that time, the cutting blades 29 and 32 might touch and scrub the optical fiber main body 51, but the cutting blades 29 and 32 would flexibly change shapes, and the optical fiber main body and the primary coating would not be scratched. In addition, since the blades of plastics are slippery on the peripheral surface of the optical fiber main body, the optical fiber main body would not be loaded with severe tension. When the blades 29 and 32 are worn away by scrubbing, they can be replaced. The operator can easily peel off the edge portion 51A of the optical fiber main body by softly gripping the pusher body 27 and the receiver body 25 in a way like gripping a pair of scissors.

It is preferable that the leading edges of a pair of cutting blades move toward each other as the embodiment shown above. If the leading edges move to different points in their thickness directions, they would exert shearing force on the optical fiber as a pair of scissors. Such force might damage the optical fiber main body. In order to prevent such a case, the edge surfaces are preferably perpendicular to the side surfaces of the cutting blade. In addition, it is further preferable that a guide groove 30 having a cutting blade 32 therein and means for guiding a cutting blade 29 into the guide groove 30 are provided in order to position the two edge surfaces, as shown in FIG. 12. Furthermore, at least one of the cutting blades have a thickness of more than a certain minimum thickness in order to assure that the edges of the cutting blades 29 and 32 bump together.

FIGS. 16, 17, 18 and 19 are enlarged views near the edge of cutting blades. The Figures shows one operation of the device according to the present invention. In each Figure, the picture of the edge of cutting blade was taken under the microscope.

Figure 16:
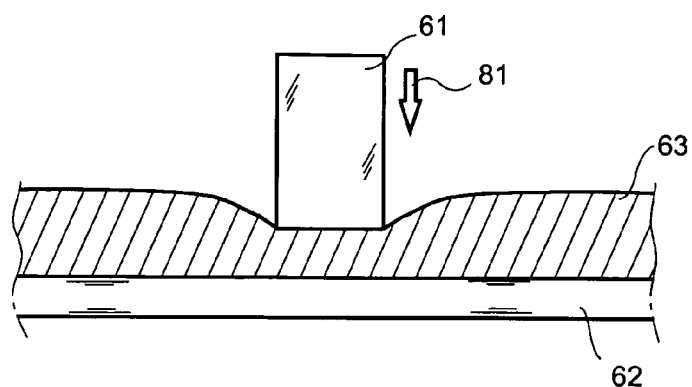
FIGS. 16, 17, 18 and 19 are enlarged views near the edge of cutting blades, showing the device according to the present invention.
Figure 17:
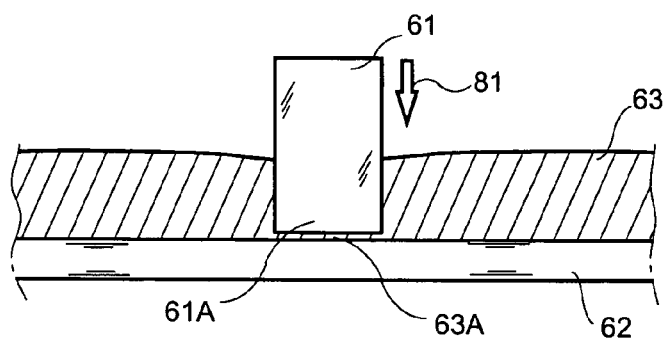

As shown in FIG. 16, the cutting blade 61 begins operation. The right half of the covering 63 will be cut off and be stripped from the optical fiber 62. As shown in FIG. 16, pressure is applied in the direction of an arrow 81 to the cutting blade 61. The cutting blade 61 collapses the covering 63 and cuts the covering 63 of the optical fiber 62. As shown in FIG. 17, the edge surface 61A of the cutting blade 61 approaches the surface of the optical fiber 62.

Figure 18:
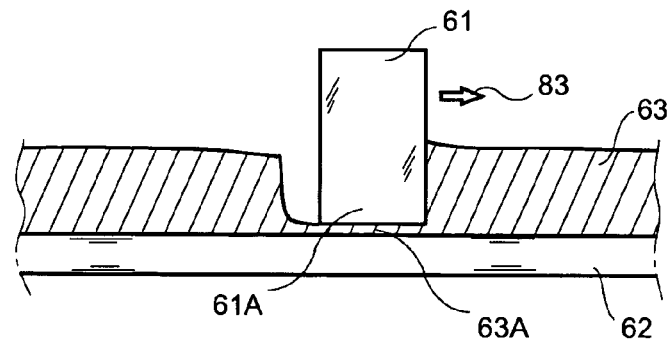
Figure 19:
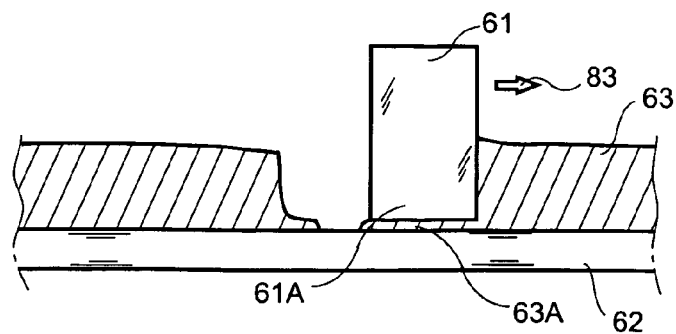

Next, as shown in FIG. 18, pressure is applied in the direction of an arrow 83 to the cutting blade 61. The cutting blade 61 moves the right half of the covering 63 rightward. As shown in FIG. 19, the covering 63 of the optical fiber 62 is stripped from the optical fiber 62.

As shown in FIG. 18, a piece of the covering 63A is left between the edge surface 61A of the cutting blade 61 and the optical fiber 62. As the edge surface 61A of a cutting blade 61 is perpendicular to the side surfaces of the cutting blade 61, the edge surface 61A does not directly cut off the covering 63 completely. The edge surface 61A of a cutting blade 61 collapses the covering and remains the piece of the covering 63A.

During the operation, the edge surface 61A of the cutting blade 61 does not contact directly on the surface of the optical fiber 62. The piece of the covering 63A carries out the role of a cushion. In this manner, the cutting blade 61 does not damage the surface of the optical fiber 62.

Moreover, the piece of the covering 63A carries out the role of lubricant. As shown in FIG. 18, when pressure is applied in the direction of an arrow 83 to the cutting blade 61, the edge surface 61A of the cutting blade 61 moves along the surface of the optical fiber 62. During the operation, the edge surface 61A of the cutting blade 61 does not directly contact the surface of the optical fiber 62. In this manner, the cutting blade 61 cannot damage the surface of the optical fiber 62 when the coating 63 is stripped off of the optical fiber 62.

FIGS. 20, 21, 22 and 23 are enlarged views near the edge of conventional cutting blades. The Figures show one operation of a conventional device.

Figure 20:
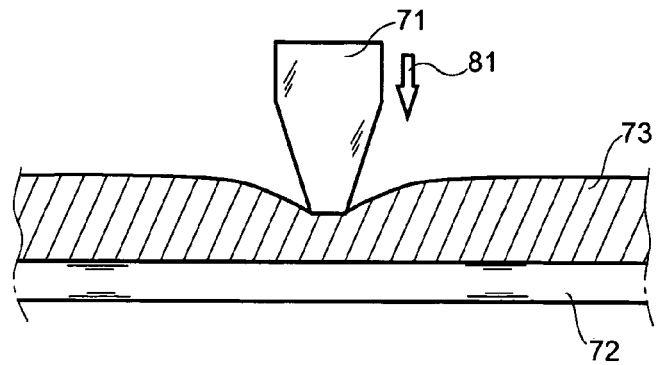
FIGS. 20, 21, 22 and 23 are enlarged views near the edge of cutting blades, showing the conventional device.
Figure 21:
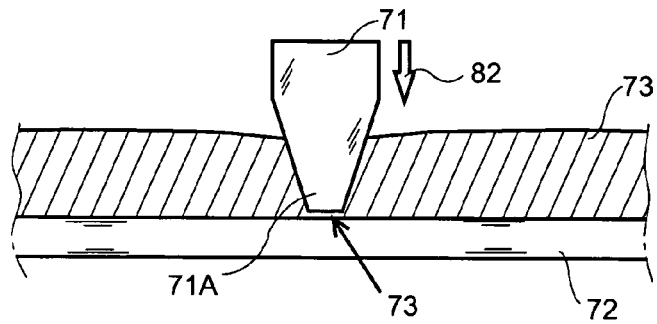

As shown in FIG. 20, the cutting blade 71 begins operation. The right half of the covering 73 will be cut off and be stripped from the optical fiber 72. As shown in FIG. 21, pressure is applied in the direction of an arrow 81 to the cutting blade 71. The cutting blade 71 cuts the covering 73 of the optical fiber 72. As shown in FIG. 21, the edge 71A of the cutting blade 71 approaches to the surface of the optical fiber 72.

Figure 22:
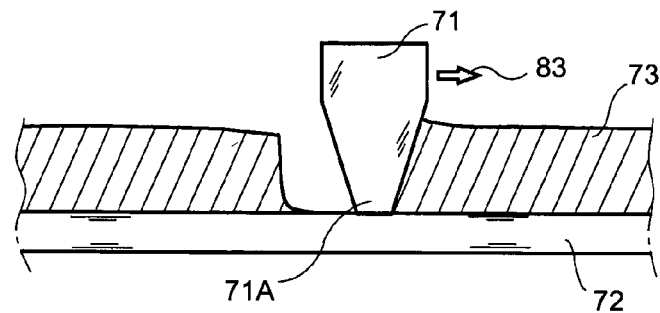
Figure 23:
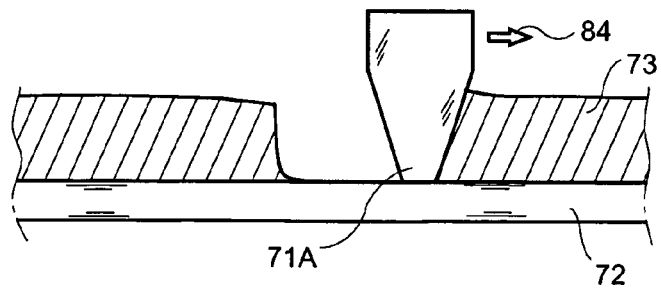

Next, as shown in FIG. 22, pressure is applied in the direction of an arrow 83 to the cutting blade 71. The cutting blade 71 moves the right half of the covering 73 rightward. As shown in FIG. 23, the covering 73 of the optical fiber 72 will be stripped from the optical fiber 72. Since the edge 71A of a cutting blade 71 is knife shaped, the edge 71A cuts off the covering 73.

In this operation, the edge 71A of the cutting blade 71 contacts directly on the surface of the optical fiber 72, which often damages the surface of the optical fiber 72.

Moreover, as shown in FIG. 18, when pressure is applied in the direction of arrow 83 to the cutting blade 71, the edge 71A of the cutting blade 71 moves along the surface of the optical fiber 72. During the operation, the edge 71A of the cutting blade 71 contacts directly on the surface of the optical fiber 72, which often damages the surface of the optical fiber 72.

The invention claimed is:

1. A device for removing a covering layer of an optical fiber, the device comprising:
    a receiver body for receiving an optical fiber having a covering layer to be removed; and
    a cutting blade adaptive to be relatively moved toward said receiver body for cutting the covering layer of the optical fiber, wherein said cutting blade comprises an elastic plastic, said cutting blade has an edge surface substantially perpendicular to two parallel side surfaces of the cutting blade for cutting into the covering layer of the optical fiber, wherein the two parallel side surfaces extend from the edge surface to an opposing edge surface that is spaced from the edge surface, and said receiver body is sized such that when an optical fiber is set on a surface of said receiver body opposite to said cutting blade the length of the optical fiber is longer than the thickness of said cutting blade, and said cutting blade has a bending elasticity in a range of 900-20,000 MPa.

2. A device for removing a covering layer of an optical fiber, the device comprising:
    a receiver body for receiving an optical fiber having a covering layer to be removed; and
    a cutting blade adaptive to be relatively moved toward said receiver body for cutting the covering layer of the optical fiber, wherein said cutting blade comprises an elastic plastic, said cutting blade has an edge surface substantially perpendicular to two parallel side surfaces of the cutting blade for cutting into the covering layer of the optical fiber, wherein the two parallel side surfaces extend from the edge surface to an opposing edge surface that is spaced from the edge surface, and said receiver body is sized such that when an optical fiber is set on a surface of said receiver body opposite to said cutting blade the length of the optical fiber is longer than the thickness of said cutting blade, and said cutting blade has a thickness in a range of 0.06-1 mm.

3. A device for removing a covering layer of an optical fiber according to claim 1, further comprising a guide means for guiding the optical fiber to a removing position between said receiver body and the cutting blade.

4. A device for removing a covering layer of an optical fiber according to claim 2, further comprising a guide means for guiding the optical fiber to a removing position between said receiver body and the cutting blade.

5. A device for removing a covering layer of an optical fiber according to claim 1, wherein the cutting blade has a thickness in a range of 0.06-1 mm.

6. A device for removing a covering layer of an optical fiber according to claim 5, further comprising a guide means for guiding the optical fiber to a removing position between said receiver body and the cutting blade.

7. A device for removing a covering layer of an optical fiber, the device comprising:
    first and second cutting blades for cutting a covering layer of an optical fiber by moving toward each other, wherein each of said cutting blades comprises an elastic plastic, each of said cutting blades have edge surfaces substantially perpendicular to two corresponding parallel side surfaces of the cutting blade for cutting into the covering layer of the optical fiber, wherein the two parallel side surfaces extend from the edge surface to an opposing edge surface that is spaced from the edge surface, and each of said cutting blades has a thickness in a range of 0.06-1 mm.

8. A device for removing a covering layer of an optical fiber, the device comprising:
    first and second cutting blades for cutting a covering layer of an optical fiber by moving toward each other, wherein each of said cutting blades comprises elastic plastics, each of said cutting blades have edge surfaces substantially perpendicular to two corresponding parallel side surfaces of the cutting blade for cutting into the covering layer of the optical fiber, wherein the two parallel side surfaces extend from the edge surface to an opposing edge surface that is spaced from the edge surface, and each of said cutting blades has a bending elasticity in a range of 900-20,000 MPa.

9. A device for removing a covering layer of an optical fiber according to claim 7, further comprising a guide means for moving the first and second cutting blades toward each other so that edges of the cutting blades face each other.

10. A device for removing a covering layer of an optical fiber according to claim 8, further comprising a guide means for moving the first and second cutting blades toward each other so that edges of the cutting blades face each other.

11. A device for removing a covering layer of an optical fiber, the device comprising:

first and second cutting blades for cutting a covering layer of an optical fiber by moving toward each other, wherein each of said cutting blades comprises an elastic plastic, each of said cutting blades has an edge surface substantially perpendicular to two parallel side surfaces of the cutting blade for cutting into the covering layer of the optical fiber, wherein the two parallel side surfaces extend from the edge surface to an opposing edge surface that is spaced from the edge surface, and each of said cutting blades has a thickness in a range of 0.06-1 mm and a bending elasticity in a range of 900 -20,000 MPa.

12. A device for removing a covering layer of an optical fiber according to claim 11, further comprising a guide means for moving the first and second cutting blades toward each other so that edges of the cutting blades face each other.

13. A device for removing a covering layer of an optical fiber according to claim 1, wherein a length of the cutting blade and the receiver body are always substantially parallel.

14. A device for removing a covering layer of an optical fiber according to claim 2, wherein a length of the cutting blade and the receiver body are always substantially parallel.

15. A method for removing a covering layer of an optical fiber, the method comprising:

using a device comprising a receiver body for receiving an optical fiber having a covering layer to be removed and a cutting blade adaptive to be relatively moved toward said receiver body for cutting the covering layer of the optical fiber, wherein said cutting blade comprises an elastic plastic, said cutting blade has an edge surface substantially perpendicular to two parallel side surfaces of the cutting blade for cutting into the covering layer of the optical fiber, wherein the two parallel side surfaces extend from the edge surface to an opposing edge surface that is spaced from the edge surface, and said receiver body is sized such that when the optical fiber is set on a surface of said receiver body opposite to said cutting blade the length of the optical fiber is longer than the thickness of said cutting blade, and said cutting blade has a bending elasticity in a range of 900-20,000 MPa, to remove the covering layer of the optical fiber;

applying pressure to the cutting blade so that the edge surface engages the covering layer; and moving the cutting blade in a direction along a longitudinal axis of the optical fiber so that the edge surface strips the covering layer of the optical fiber.

\* \* \* \* \*

UNITED STATES PATENT AND TRADEMARK OFFICE
CERTIFICATE OF CORRECTION

PATENT NO.        : 7,398,599 B2
APPLICATION NO.   : 10/783022
DATED             : July 15, 2008
INVENTOR(S)       : Keiko Shiraishi et al.

It is certified that error appears in the above-identified patent and that said Letters Patent is hereby corrected as shown below:

On Title Page, Item (73) should read Assignee:

SWCC Showa Cable Systems Co., Ltd (Tokyo, JP)

Nippon Telegraph & Telephone Co., Ltd (Tokyo, JP)

Signed and Sealed this

Thirtieth Day of December, 2008

JON W. DUDAS
*Director of the United States Patent and Trademark Office*